United States Patent
Chiam et al.

(10) Patent No.: US 12,548,681 B2
(45) Date of Patent: Feb. 10, 2026

(54) METHOD AND DEVICE FOR ADAPTIVELY DISPLAYING AT LEAST ONE POTENTIAL SUBJECT AND A TARGET SUBJECT

(71) Applicant: NEC Corporation, Tokyo (JP)

(72) Inventors: Pujianto Christopher Chiam, Singapore (SG); Hui Lam Ong, Singapore (SG); Satoshi Yamazaki, Singapore (SG); Adeline Chong, Singapore (SG)

(73) Assignee: NEC CORPORATION, Tokyo (JP)

(*) Notice: Subject to any disclaimer, the term of this patent is extended or adjusted under 35 U.S.C. 154(b) by 436 days.

(21) Appl. No.: 18/010,156

(22) PCT Filed: May 25, 2021

(86) PCT No.: PCT/JP2021/019694
§ 371 (c)(1),
(2) Date: Dec. 13, 2022

(87) PCT Pub. No.: WO2021/256184
PCT Pub. Date: Dec. 23, 2021

(65) Prior Publication Data
US 2023/0245789 A1    Aug. 3, 2023

(30) Foreign Application Priority Data

Jun. 18, 2020  (SG) .............................. 10202005811P

(51) Int. Cl.
*G16H 50/80*    (2018.01)
*G06F 16/901*   (2019.01)
(Continued)

(52) U.S. Cl.
CPC ......... *G16H 50/80* (2018.01); *G06F 16/9024* (2019.01); *G06V 10/56* (2022.01); *G06V 10/761* (2022.01); *G06V 2201/07* (2022.01)

(58) Field of Classification Search
None
See application file for complete search history.

(56) References Cited

U.S. PATENT DOCUMENTS 9,785,696 B1 * 10/2017 Yakhnenko ............. G06F 16/30
10,467,504 B1 * 11/2019 Hamedi .................. G06F 18/22
(Continued)

OTHER PUBLICATIONS

Author(s):Vehlow Title: Visualizing group structures Journal: researchgate [online]. Publication date: 2015. [retrieved on: Feb. 15, 2025 ]. Retrieved from the Internet: < URL: https://www.researchgate.net/profile/Corinna-Vehlow/publication/280878061_The_State_of_the_Art_in_Visualizing_Group_Struc> (Year: 2015).*

(Continued)

*Primary Examiner* — David J Stoltenberg

(57) ABSTRACT

According to an a first aspect, there is a method of adaptively displaying at least one potential subject and a target subject, the method comprising receiving an input selecting the target subject from a network graph including a plurality of subjects who appear in the proximity as the target subject (204); identifying the at least one potential subject based on a threshold, the threshold indicating the minimum level of relatedness from the target subject (206); and displaying the at least one potential subject, the target subject and an edge between each of the at least one potential subject and the target subject, the edge indicating a level of relationship between the at least one potential subject and the target subject (208).

12 Claims, 12 Drawing Sheets

(51) Int. Cl.
G06V 10/56 (2022.01)
G06V 10/74 (2022.01)

(56) References Cited

U.S. PATENT DOCUMENTS

| | | | |
|---|---|---|---|
| 2012/0051635 A1* | 3/2012 | Kunkel | G06T 7/136 |
| | | | 382/165 |
| 2012/0182882 A1* | 7/2012 | Chrapko | H04L 43/0811 |
| | | | 370/248 |
| 2014/0149376 A1 | 5/2014 | Kutaragi et al. | |
| 2015/0032535 A1 | 1/2015 | Li et al. | |
| 2015/0227691 A1* | 8/2015 | Bhattacharya | G06N 7/01 |
| | | | 705/3 |
| 2015/0242689 A1* | 8/2015 | Mau | G06F 16/583 |
| | | | 382/190 |
| 2016/0323232 A1 | 11/2016 | Kristinsson et al. | |
| 2018/0189990 A1* | 7/2018 | Cardno | G06T 11/206 |

OTHER PUBLICATIONS

International Search Report for PCT Application No. PCT/JP2021/019694, mailed on Jul. 20, 2021.
Written opinion for PCT Application No. PCT/JP2021/019694, mailed on Jul. 20, 2021.
JP Office Communication for JP Application No. 2022-575284, mailed on Oct. 24, 2023 with English Translation.

* cited by examiner

METHOD AND DEVICE FOR ADAPTIVELY DISPLAYING AT LEAST ONE POTENTIAL SUBJECT AND A TARGET SUBJECT

TECHNICAL FIELD

The present invention relates broadly, but not exclusively, to a method and a device for adaptively displaying at least one potential subject and a target subject.

BACKGROUND ART

Video analytics systems have advanced a lot for the past years. The need of automatic generation of information (such as face extraction, matching and tracking) is not only common for public and security sectors, but also an important input for other sectors such as tourism & hospitality, retail, and health.

It is quite straight forward to plot a small network of co-appearances using out-of-the-box network graph visualization tools such as vis.js, plotly and tableau network graph among many other network graph visualization tools. With the tremendous amount of input footage, it is possible to expect a huge network of co-appearances that uncovers hundreds or more potential associates.

SUMMARY OF INVENTION

Technical Problem

As the complexity of the network grows, however, it is difficult to uncover the specific potential associates that are highly related to the input persons or target subject. It would be akin to finding a needle in the haystack.

During a pandemic like COVID-19, the number of infected persons can grow exponentially each day It is possible to generate a large network of persons who potentially spread the disease from one subject to another. It would be challenging to manually plough through the data to detect the transmission link of the disease (where two seemingly unconnected Subjects are infected); and uncover persons in contact with an infected subject with the highest risk of contracting the disease from the subject.

Herein disclosed are embodiments of a device and methods for adaptively displaying at least one potential subject and a target subject that addresses one or more of the above problems.

Furthermore, other desirable features and characteristics will become apparent from the subsequent detailed description and the appended claims, taken in conjunction with the accompanying drawings and this background of the disclosure.

Solution to Problem

According to a first aspect, there is a method of adaptively displaying at least one potential subject and a target subject, the method comprising receiving an input selecting the target subject from a network graph including a plurality of subjects who appear in the proximity as the target subject; identifying the at least one potential subject based on a threshold, the threshold indicating the minimum level of relatedness from the target subject; and displaying the at least one potential subject, the target subject and an edge between each of the at least one potential subject and the target subject, the edge indicating a level of relationship between the at least one potential subject and the target subject.

According to a second aspect, there is an apparatus for adaptively displaying at least one potential subject and a target subject, the apparatus comprising: at least one processor; and at least one memory including computer program code; the at least one memory and the computer program code configured to, with at least one processor, cause the apparatus at least to: receive an input selecting the target subject from a network graph including a plurality of subjects who appear in the proximity as the target subject; identify the at least one potential subject based on a threshold, the threshold indicating the minimum level of relatedness from the target subject; and display the at least one potential subject, the target subject and an edge between each of the at least one potential subject and the target subject, the edge indicating a level of relationship between the at least one potential subject and the target subject.

BRIEF DESCRIPTION OF DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention will be better understood and readily apparent to one of ordinary skill in the art from the following written description, by way of example only, and in conjunction with the drawings, in which.

DESCRIPTION OF EMBODIMENTS

Terms Description

Figure 1:
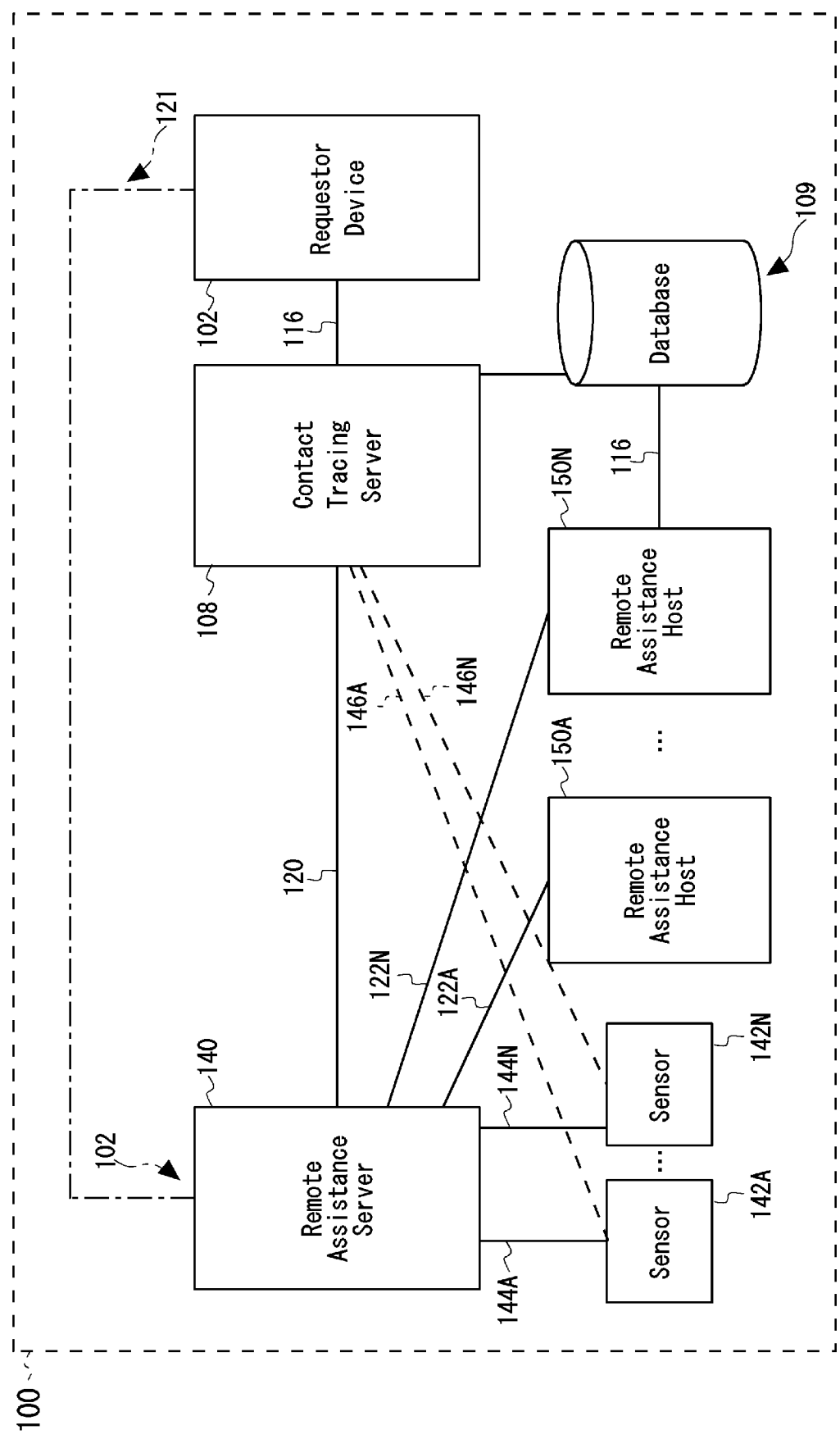
FIG. 1 shows a system for adaptively displaying at least one potential subject and a target subject according to an aspect of the present disclosure.

Subject—a subject may be any suitable type of entity, which may include a person, a patient and a user.

The term target subject is used herein to identify a person, a user or patient that is of interest. The target subject may be one that is selected by a user input or one who is identified to be a carrier of a virus.

A potential subject is used herein to relate to a person who is related to the subject (e.g. partner or companion) or in-contact with the target subject. For example, in the context of pandemic outbreak, the potential subject is someone who may be at risk of contracting virus or spreading virus from the potential subject to others.

A user who is registered to a contact tracing server will be called a registered user. A user who is not registered to the contact tracing server will be called a non-registered user. It is possible for the user to obtain graphical representation of any subject on a network graph.

Contact tracing server—The contact tracing server is a server that hosts software application programs for receiving inputs, processing data and objectively providing graphical representation. The contact tracing server communicates with any other servers (e.g., a remote assistance server) to manage requests. The contact tracing server communicates with a remote assistance server to display a graphical representation of a potential subject and a target subject. Contact tracing servers may use a variety of different protocols and procedures in order to manage the data and provide a graphical representation.

The contact tracing server is usually managed by a provider that may be an entity (e.g. a company or organization) which operates to process requests, manage data and display graphical representations that are useful to a situation. The server may include one or more computing devices that are used for processing graphical representation requests and providing customisable services depending on situations.

A contact tracing account—a contact tracing account is an account of a user who is registered at a contact tracing server. In certain circumstances, the contact tracing account is not required to use the remote assistance server. A contact tracing account includes details (e.g., name, address, vehicle etc.) of a user.

The contact tracing server manages contact tracing accounts of users and the interactions between users and other external servers, along with the data that is exchanged.

DETAILED DESCRIPTION

Where reference is made in any one or more of the accompanying drawings to steps and/or features, which have the same reference numerals, those steps and/or features have for the purposes of this description the same function (s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

The System 100

FIG. 1 illustrates a block diagram of a system 100 for objectively determining a frailty score of a subject.

The system 100 comprises a requestor device 102, a contact tracing server 108, a remote assistance server 140, remote assistance hosts 150A to 150N, and sensors 142A to 142N.

The requestor device 102 is in communication with a contact tracing server 108 and/or a remote assistance server 140 via a connection 116 and 121, respectively. The connection 116 and 121 may be wireless (e.g., via NFC communication, Bluetooth, etc.) or over a network (e.g., the Internet). The connection 116 and 121 may also be that of a network (e.g., the Internet).

The contact tracing server 108 is further in communication with the remote assistance server 140 via a connection 120. The connection 120 may be over a network (e.g., a local area network, a wide area network, the Internet, etc.). In one arrangement, the frailty assessment server 108 and the remote assistance server 140 are combined and the connection 120 may be an interconnected bus.

The remote assistance server 140, in turn, is in communication with the remote assistance hosts 150A to 150N via respective connections 122A to 122N. The connections 122A to 122N may be a network (e.g., the Internet).

The remote assistance hosts 150A to 150N are servers. The term host is used herein to differentiate between the remote assistance hosts 150A to 150N and the remote assistance server 140. The remote assistance hosts 150A to 150N are collectively referred to herein as the remote assistance hosts 150, while the remote assistance host 150 refers to one of the remote assistance hosts 150. The remote assistance hosts 150 may be combined with the remote assistance server 140.

In an example, the remote assistance host 150 may be one managed by a hospital and the remote assistance server 140 is a central server that manages emergency calls and decides which of the remote assistance hosts 150 to forward data or retrieve data like image inputs.

Sensors 142A to 142N are connected to the remote assistance server 140 or the contact tracing server 108 via respective connections 144A to 144N or 146A to 146N. The sensors 142A to 142N are collectively referred to herein as the sensors 142. The connections 144A to 144N are collectively referred to herein as the connections 144, while the connection 144 refers to one of the connections 144. Similarly, the connections 146A to 146N are collectively referred to herein as the connections 146, while the connection 146 refers to one of the connections 146. The connections 144 and 146 may be wireless (e.g., via NFC communication, Bluetooth, etc.) or over a network (e.g., the Internet). The sensor 142 may be one of an image capturing device, video capturing device, and motion sensor and may be configured to send an input depending on its type, to at least one of the contact tracing server 108.

In the illustrative embodiment, each of the devices 102 and 142; and the servers 108, 140, and 150 provides an interface to enable communication with other connected devices 102 and 142 and/or servers 108, 140, and 150. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Use of the term 'server' herein can mean a single computing device or a plurality of interconnected computing devices which operate together to perform a particular function. That is, the server may be contained within a single hardware unit or be distributed among several or many different hardware units.

The Remote Assistance Server 140

The remote assistance server 140 is associated with an entity (e.g. a company or organization or moderator of the service). In one arrangement, the remote assistance server 140 is owned and operated by the entity operating the server 108. In such an arrangement, the remote assistance server 140 may be implemented as a part (e.g., a computer program module, a computing device, etc.) of server 108.

The remote assistance server 140 may also be configured to manage the registration of users. A registered user has a contact tracing account (see the discussion above) which includes details of the user. The registration step is called on-boarding. A user may use either the requestor device 102 to perform on-boarding to the remote assistance server 140.

It is not necessary to have a contact tracing account at the remote assistance server 140 to access the functionalities of the remote assistance server 140. However, there are functions that are available to a registered user. For example, it may be possible to display graphical representation of target subjects and potential subjects in other jurisdictions. These additional functions will be discussed below.

The on-boarding process for a user is performed by the user through one of the requestor device 102. In one arrangement, the user downloads an app (which includes the API to interact with the remote assistance server 140) to the sensor 142. In another arrangement, the user accesses a website (which includes the API to interact with the remote assistance server 140) on the requestor device 102.

Details of the registration include, for example, name of the user, address of the user, emergency contact, or other important information and the sensor 142 that is authorized to update the remote assistance account, and the like.

Once on-boarded, the user would have a contact tracing account that stores all the details.

The Requestor Device 102

The requestor device 102 is associated with a subject (or requestor) who is a party to a contact tracing request that starts at the requestor device 102. The requestor may be a concerned member of the public who is assisting to get data necessary to obtain a graphical representation of a network graph. The requestor device 102 may be a computing device such as a desktop computer, an interactive voice response (IVR) system, a smartphone, a laptop computer, a personal digital assistant computer (PDA), a mobile computer, a tablet computer, and the like.

In one example arrangement, the requestor device 102 is a computing device in a watch or similar wearable and is fitted with a wireless communications interface.

The Contact Tracing Server 108

The frailty assessment server 108 is as described above in the terms description section.

The contact tracing server 108 is configured to process processes relating to objectively manage a network graph and adaptively display a potential subject and a target subject.

The Remote Access Hosts 150

The remote access host 150 is a server associated with an entity (e.g. a company or organization) which manages (e.g. establishes, administers) healthcare information regarding information relating to a subject who is likely to be at risk of a virus.

In one arrangement, the entity is a hospital. Therefore, each entity operates a remote access host 150 to manage the resources by that entity. In one arrangement, a remote access host 150 receives an alert signal that a subject is likely to be carrier of a virus. The remote access host 150 may then arrange to send resources to the location identified by the location information included in the alert signal. For example, the host may be one that is configured to obtain relevant video or image input for processing.

In one arrangement, the frailty score can be automatically updated on the contact tracing account associated with the user. Advantageously, such information is valuable to the law enforcement. It reduces number of hours looking through camera footage to investigate the possible links between persons of interest.

The information is particularly useful in the pandemic, so that building management and the health sector can more efficiently and effectively carry out contact tracing. The network of co-appearances, coupled with duration and distance analyzer, helps to identify how the disease spreads from one person to another.

Conventionally, contact tracing is extremely labour intensive. Many officers who are tasked to analyse hours of video and image footage might be prone to fatigue and errors. That leads to misdetection of the potential person with illness symptoms.

Sensor 142

The sensor 142 is associated with a user associated with the requestor device 102. More details of how the sensor may be utilised will be provided below.

Figure 2:
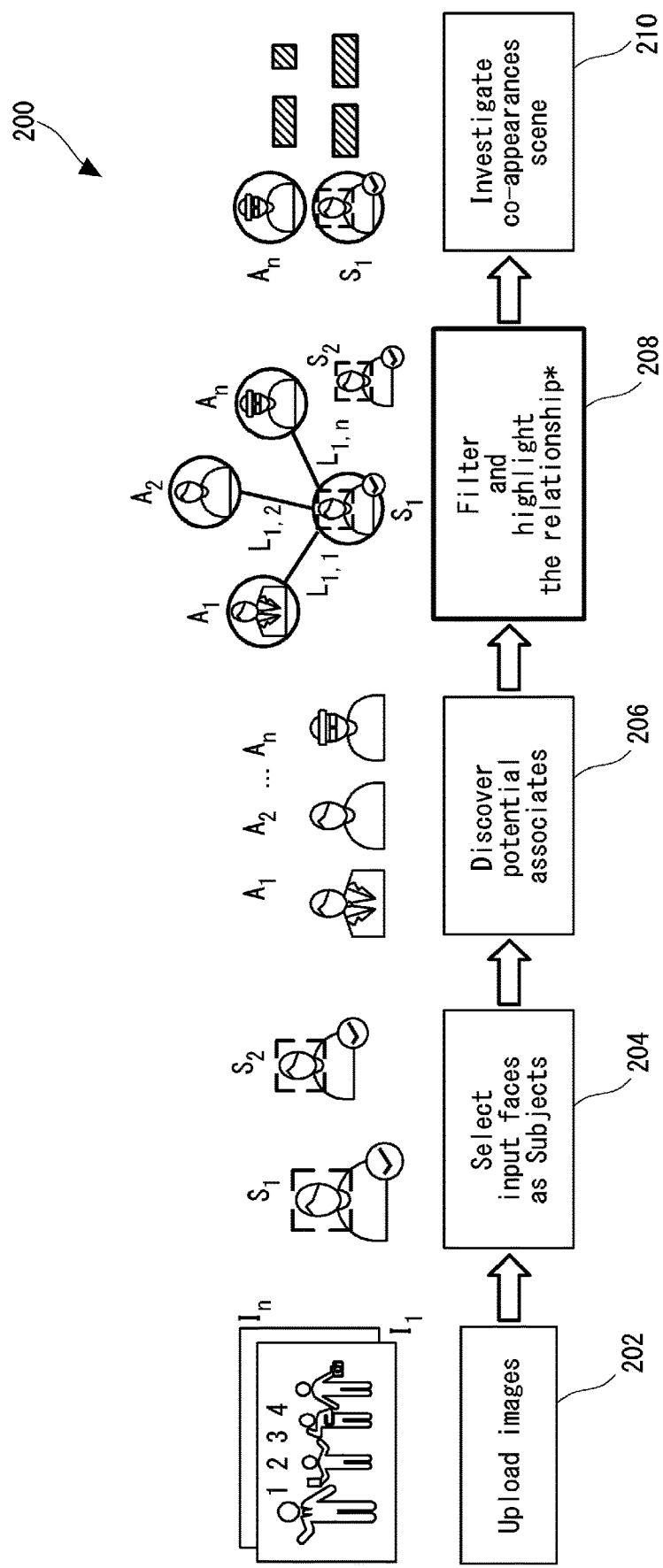
FIG. 2 shows a diagram for adaptively displaying at least one potential subject and a target subject according to an embodiment of the present disclosure.

FIG. 2 shows a diagram 200 for adaptively displaying at least one potential subject and a target subject according to an embodiment of the present disclosure.

At 202, a plurality of images may be uploaded to various devices (eg. 142 shown in FIG. 1). At 204, one or more images uploaded at 202 may be selected as subjects (or target subjects) of concern. At 206, one or more steps are taken to identify (or discover) potential subjects (or "potential targets") that may be related to the target subjects. At 208, one or more steps are taken to identify the relationship between each of the potential subjects and the target subject. More information can be found in the figures below. At step 210, co-appearance scene may be investigated.

Figure 3:
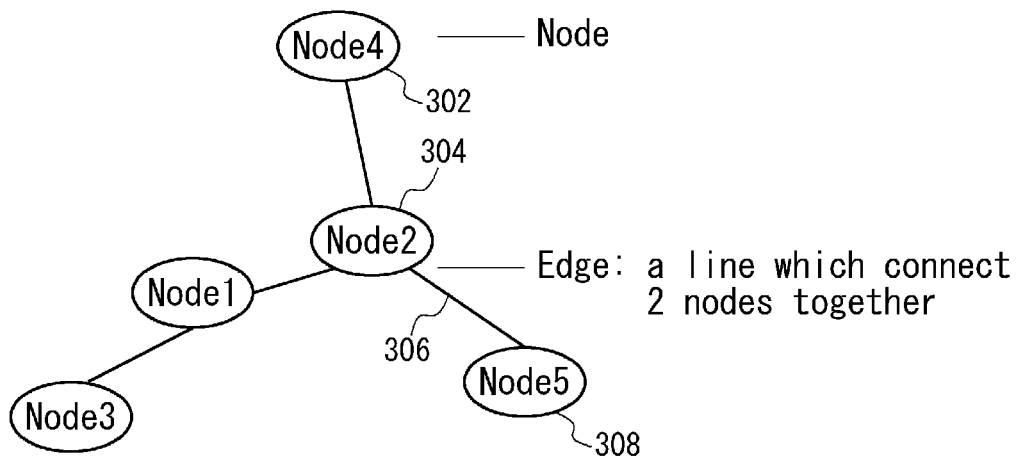
FIG. 3 shows a graphical representation of adaptively displaying at least one potential subject and a target subject according to an embodiment of the present disclosure.

FIG. 3 shows a graphical representation of adaptively displaying at least one potential subject and a target subject according to an embodiment of the present disclosure.

Each node 302, 304 and 308 represents a subject. Each edge 306, which is a line or link, is one connects the two neighbouring nodes and represents the relationship between the two neighbouring nodes. The relationship may be one that is identified in 206.

Figure 4:
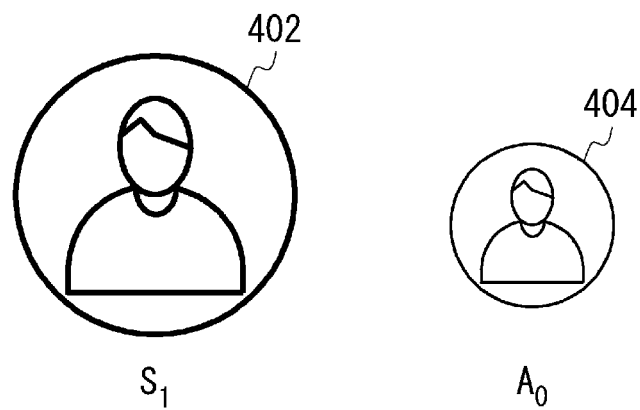
FIG. 4 shows a graphical representation of adaptively displaying at least one potential subject and a target subject according to an embodiment of the present disclosure.

FIG. 4 shows a graphical representation of adaptively displaying at least one potential subject and a target subject according to an embodiment of the present disclosure. A target subject 502 (shown as "S1") is drawn significantly different (in size and/or colour) than the potential subject 504 (shown as "A0").

The differentiation allows a user to easily spot the target subject on a display of the requestor device 102.

Figure 5:
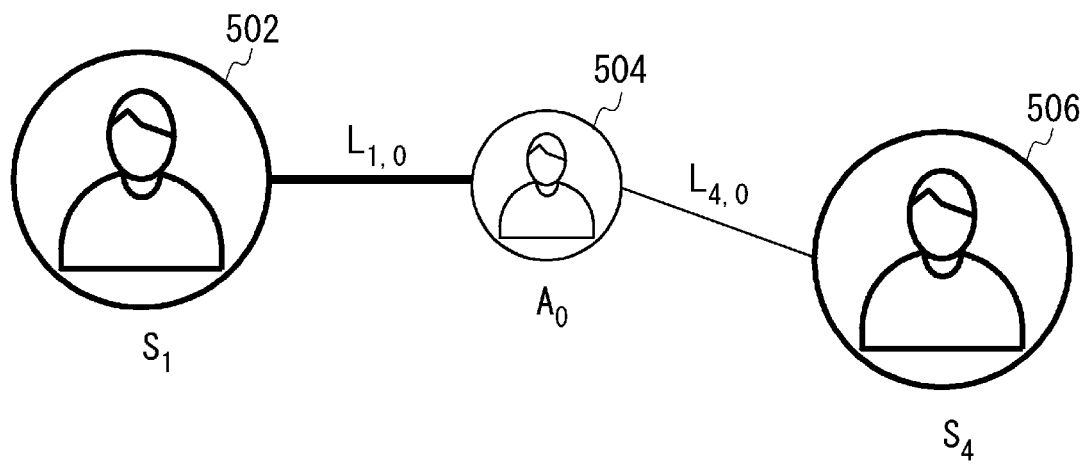
FIG. 5 shows a graphical representation of adaptively displaying at least one potential subject and a target subject according to an embodiment of the present disclosure.

FIG. 5 shows a graphical representation of adaptively displaying at least one potential subject and a target subject according to an embodiment of the present disclosure.

The edge between two nodes 502 and 504 represents the relationship between those two nodes. In an example, co-appearance strength (or how often two subjects appear at a same location together) is represented by the thickness of the edge. The thinner the edge, the weaker the co-appearance strength. The thicker the edge, the stronger the co-appearance strength.

In FIG. 5, the edge L1,0 is thicker than that L4,0. This means subjects 502 and 504 (or S1 and A0) appear together more often than subjects 506 and 504 (or S4 and A0). That is, subjects 502 and 504 (S1 and A0) have a stronger co-appearance strength (relationship) than subjects 506 and 504 (S4 and A0).

Figure 6:
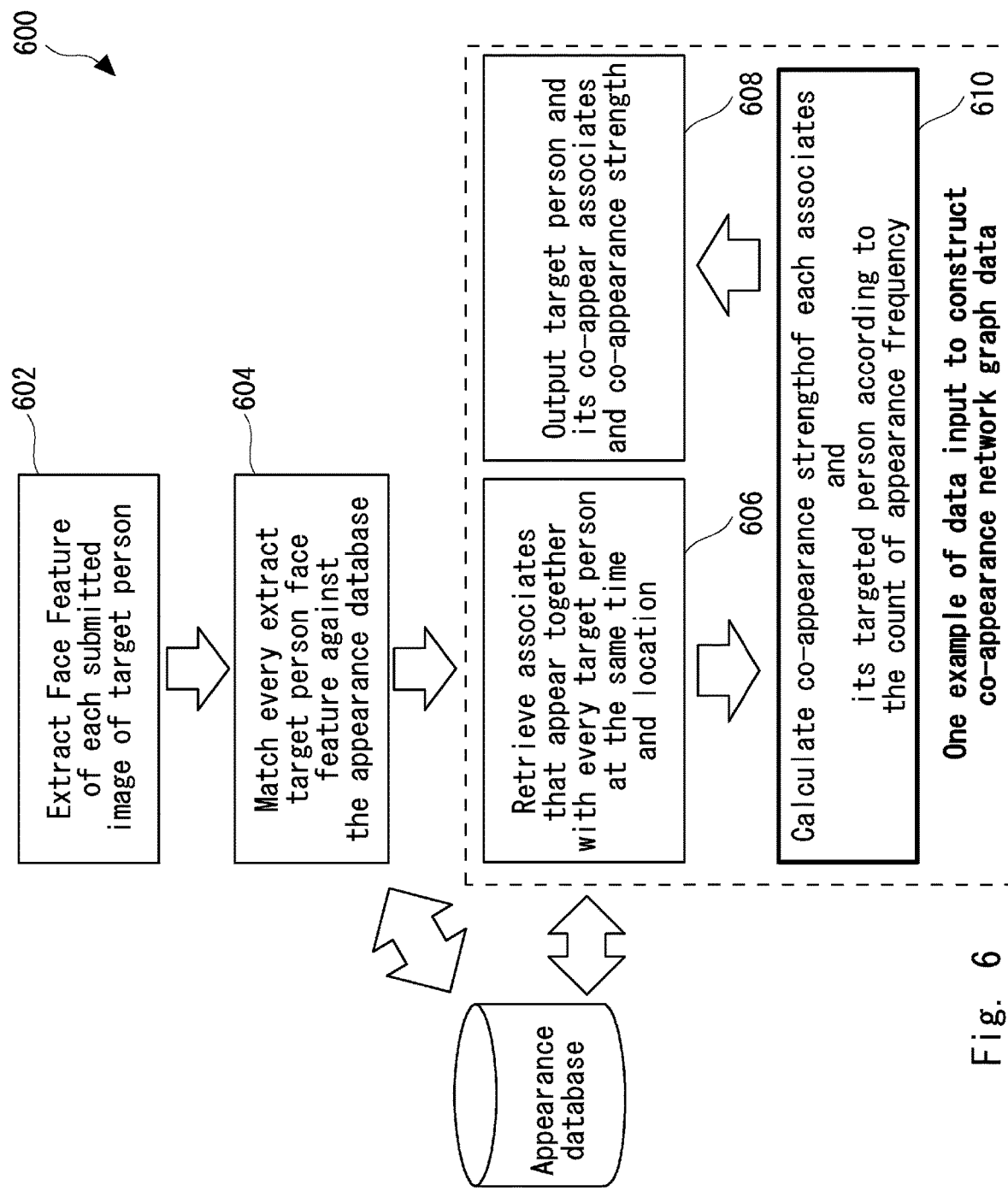
FIG. 6 shows a flow chart for constructing a co-appearance network graph including the target subject and the at least one potential subject according to an embodiment of the present disclosure.

FIG. 6 shows a flow chart for constructing a co-appearance network graph including the target subject and the at least one potential subject according to an embodiment of the present disclosure.

At step 602, facial features are extracted of each submitted image of a target subject. The facial features includes but not limited to eyes, nose, ears and mouth of a facial image.

At 604, each of the extracted facial features obtained at step 602 is then matched against each of the features stored in a database.

At 606, in response to the comparison done at step 603, images relating to at subjects or associates who appear at the same time and location as the target subject are then retrieved.

At step 610, the co-appearance strength of each potential subject and the target subject is calculated based on the number of times that each potential subject and target subject appear at the same location.

At step 608, each of the target subject and the potential subject are displayed, along with the edge that connects the target subject and each of the potential subjects. This may also be constructed as a network graph.

Figure 7:
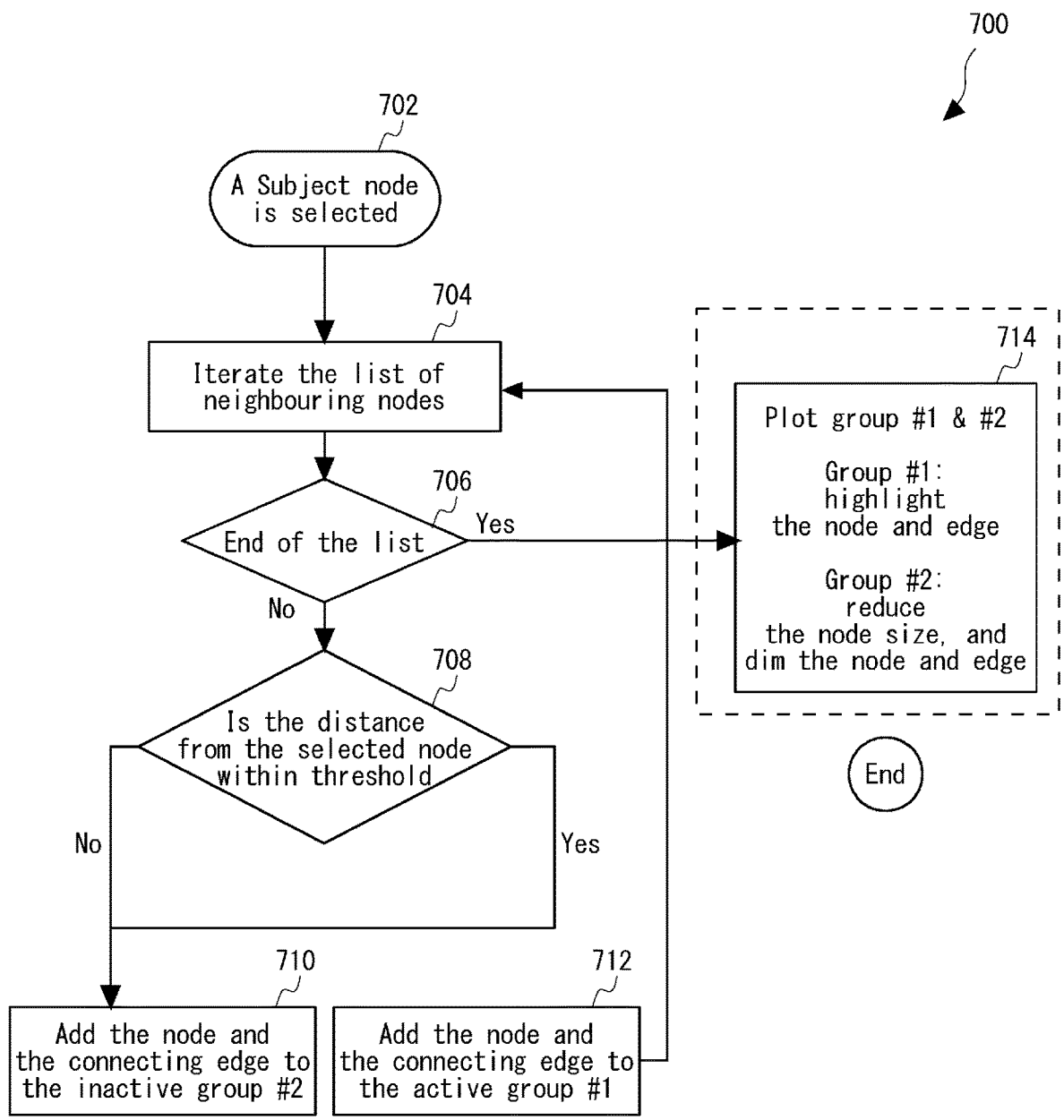
FIG. 7 shows a flow chart of adaptively displaying at least one potential subject and a target subject according to an embodiment of the present disclosure.

FIG. 7 shows a flow chart 700 of adaptively displaying at least one potential subject and a target subject according to an embodiment of the present disclosure.

At step 702, a target subject is selected. This may be done by selecting a subject node like one that is shown in FIG. 4 or 5.

At step 704, the method proceeds on to determine if there are nodes beside the selected node. These nodes are also known as neighbouring nodes.

At step 706, the method proceeds on to determine if there are any more neighbouring nodes. If it is determined to be no, the method proceeds on to step 708. If it is determined to be yes, the method proceeds on to step 714.

At step 708, the method proceeds to determine if the distance from the node selected at step 702 is within a threshold. If it is determined to be no, the method proceeds on to step 710. If it is determined to be yes, the method proceeds on to step 712.

At step 710, the selected node and the connecting edge are added to a group or inactive group #2. At step 712, the selected node and the connecting edge are added to a group or active group #1. These steps will go on until the end of the list is reached.

At step 714, groups #1 and #2 are plotted. Group #1 is one in which the node and edge are highlighted. Group #2 is one in which the size of the node is reduced and the edge connecting two nodes are dimmed. More details can be found below.

Figure 8:
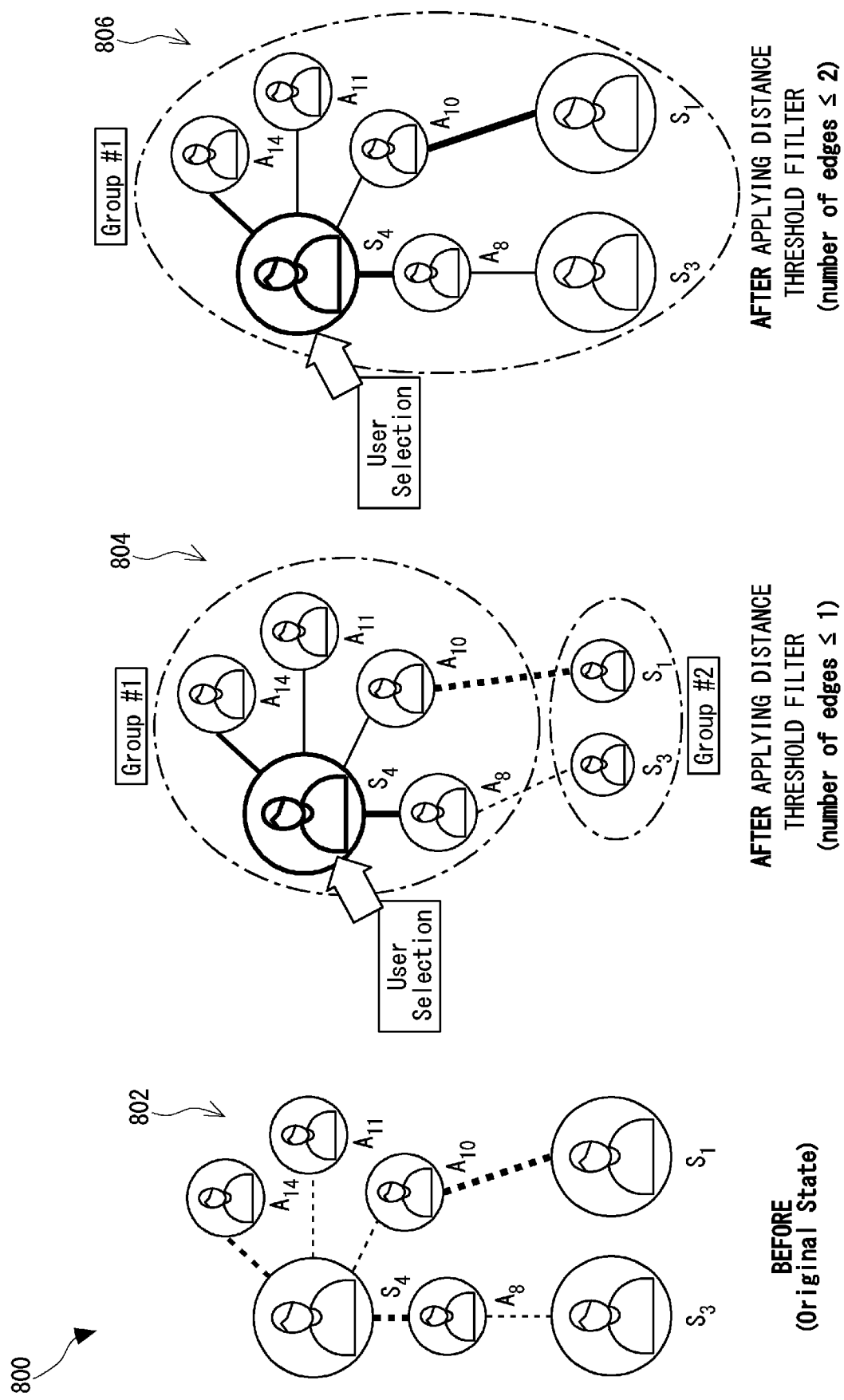
FIG. 8 shows a graphical representation for adaptively displaying at least one potential subject and a target subject according to an embodiment of the present disclosure.

FIG. 8 shows a graphical representation for adaptively displaying at least one potential subject and a target subject according to an embodiment of the present disclosure. 802 shows how a target subject and its potential subjects are displayed, together with the corresponding edges. This may be achieved by the method described in the above.

804 shows how a target subject and its potential subjects are displayed, together with the corresponding edges, when the number of edges is set as equal to or less than 1. In this example, S4 is selected as a target subject. A8, A10, A11, A14 are identified as potential subjects who may appear in the proximity of the target subject S4. The link between the target subject S4 and the potential subject A14 is thicker because they are likely to appear at the same place for a longer duration of time. Alternatively, it may also represent that the target subject S4 and the potential subject A14 appear together at one or more places.

806 shows how a target subject and its potential subjects are displayed, together with the corresponding edges, when the number of edges is set as equal to or less than 2. A8, A10, A11, A14 are identified as potential subjects who may appear in the proximity of the target subject S4. These potential subjects are directly linked to the target subject or having an edge that is equal to or less than 1. That is, A8, A10, A11, A14 are identified as group 1. In this example, other targets like S3 and S1 who are more than 1 edge away from S4 are put into group 1.

Figure 9:
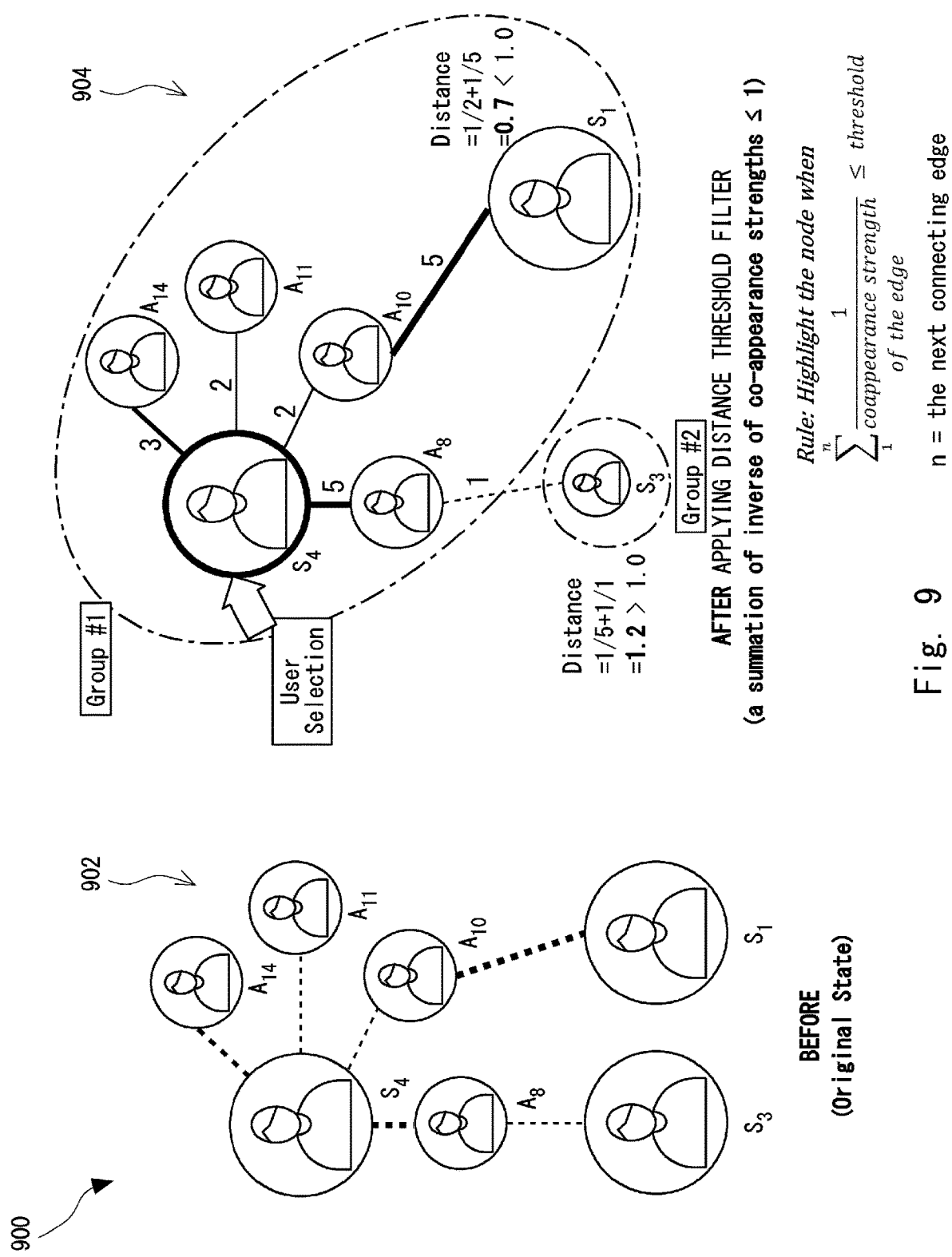
FIG. 9 shows a graphical representation of adaptively displaying at least one potential subject and a target subject according to an embodiment of the present disclosure.

FIG. 9 shows a graphical representation of adaptively displaying at least one potential subject and a target subject according to an embodiment of the present disclosure. 902 shows how a target subject and its potential subjects are displayed, together with the corresponding edges. This may be achieved by the method described in the above.

904 shows how a target subject and its potential subjects are displayed, together with the corresponding edges, when the threshold is set as equal to or less than 1.

In this example, S4 is selected as a target subject. A8, A10, A11, A14 are identified as potential subjects who may appear in the proximity of the target subject S4, having a co-appearance strength of 5, 2, 2, and 3 respectively. S1 and S3 are directly linked to A10 and A8A respectively. The co-appearance strength between S1 and S3 with A10 and A8 is 5 and 1. The threshold in this example depends on an inverse value of the co appearance strength.

The equation to determine the threshold value in this example is $$\sum_{1}^{n} \frac{1}{\text{coappearance strength of the edge}} \leq \text{threshold}$$

Where n=the next connecting edge.

The value for S1 is the sum of inverse values of the co-appearance strength between S1 and A10 (which is 1/5) and that between A10 and S4 (which is 1/5). The sum is 0.7 which is less than 1.0. Hence, in 904, S1 is included in group 1 as one of the relevant potential subjects.

Figure 10:
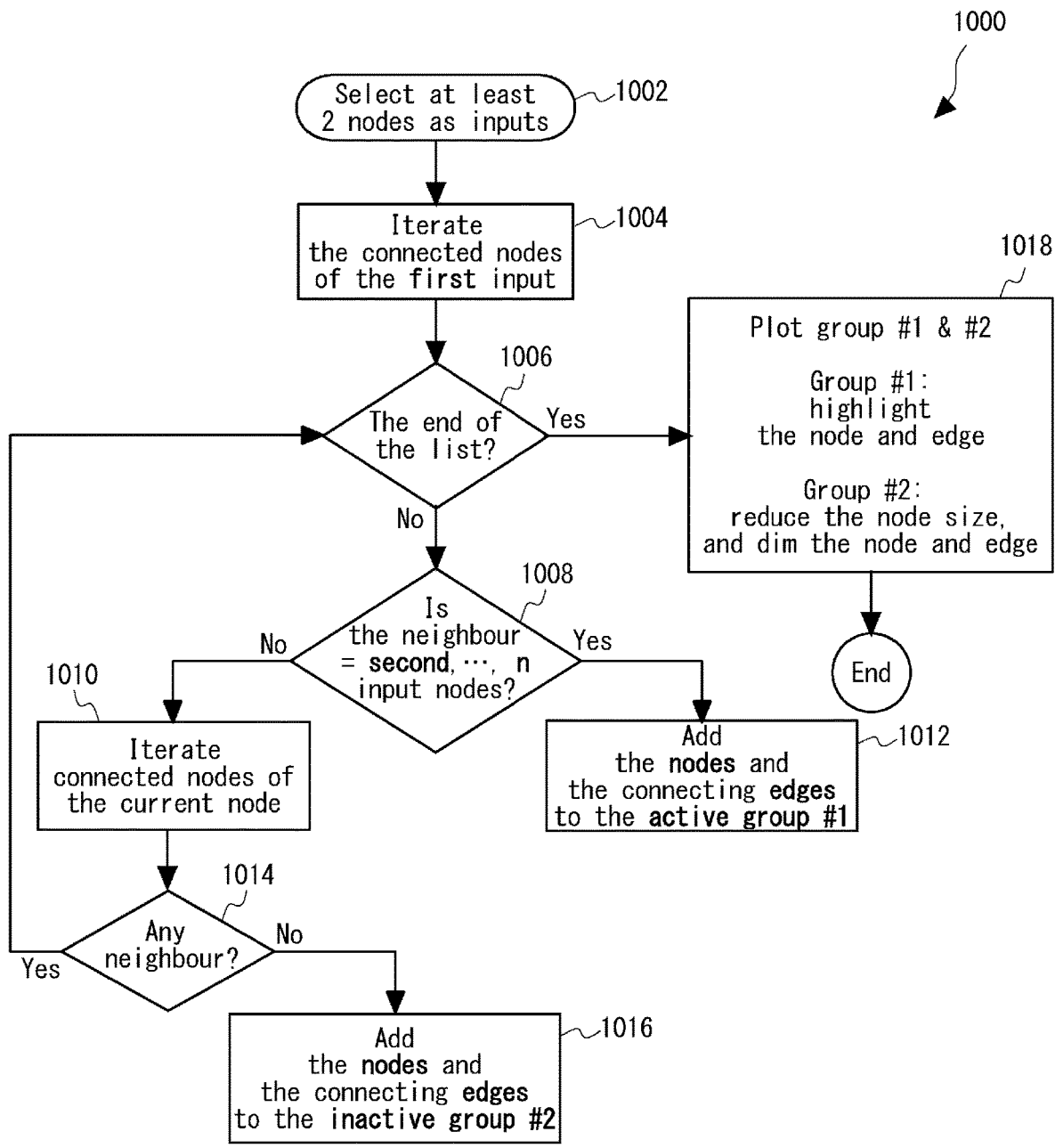
FIG. 10 shows a flow chart of adaptively displaying at least one potential subject and a target subject according to an embodiment of the present disclosure.

The FIG. 10 shows a graphical representation of adaptively displaying at least one potential subject and a target subject according to an embodiment of the present disclosure.

At step 1002, two nodes are selected as inputs or target subjects. That is, it is possible to select three or mode nodes as target subjects or subjects of interest. The method 1000 then proceeds on to step 1004.

At step 1004, nodes that are connected to the first input are iterated. The method 1000 then proceeds on to step 1006.

At step 1006, it is determined if it is the end of the list. If it is determined that it is the end of the list, the method 1000 then proceeds to step 1018. If it is determined that it is not the end of the list, the method 1000 then proceeds to step 1008.

At step 1008, it is determined if the neighbouring node is the second input. If it is determined that the neighbouring node is the second node, the method 1000 then proceeds to step 1012. If it is determined that it is not, the method 1000 then proceeds to step 1010.

At step 1010, the method proceeds on to iterate connected nodes of the current node before it proceeds on to step 1014. At step 1014, the method determines if there are any more neighbours. If it is determined to be so, the method proceeds on to step 1006. If it is determined not to be so, the method proceeds on to step 1016 in which the nodes and the connecting edges are added to the inactive group (or group 2).

At step 1012, the method proceeds on to step 1016 in which the nodes and the connecting edges are added to the active group (or group 1).

At step 1018, groups 1 and 2 are plotted. For group 1, the nodes representing the target subject and the at last one potential subject are highlighted. Similarly, the edges connecting the target subject and the at last one potential subject are highlighted. For group 2, the nodes representing the target subject and the at least one potential subject are reduced in size and dimmed. Similarly, the edges connecting the target subject and the at last one potential subject are dimmed. Alternatively, the corresponding node representing the at least one potential subject may be eliminated.

Figure 11:
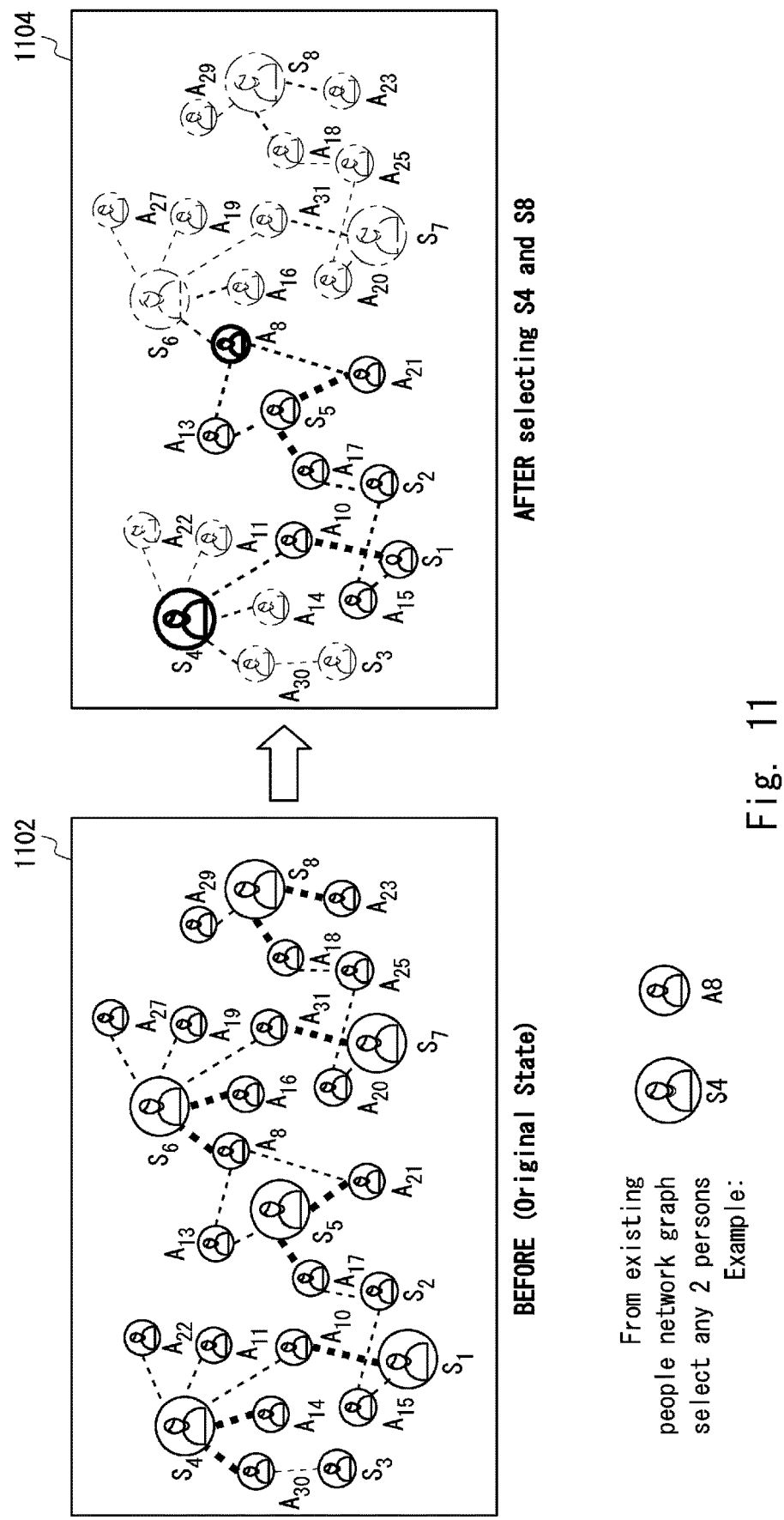
FIG. 11 shows a graphical representation for adaptively displaying at least one potential subject and a target subject according to an embodiment of the present disclosure.

FIG. 11 shows a graphical representation for adaptively displaying at least one potential subject and a target subject according to an embodiment of the present disclosure.

1102 shows how a target subject and its potential subjects are displayed, together with the corresponding edges, when two subjects are selected (for example, S4 and A8) according to a technique.

1104 shows how the target subject and its potential subjects are displayed, together with the corresponding edges, when two target subjects are selected (for example, S4 and A8) according to an embodiment. Those potential subjects that may be related to the two target subjects and their corresponding edges are highlighted. Advantageously, this example identifies the co-appearance connection sub-network from 'S4' to 'A8'. Also, it highlights the paths (for example, nodes & edges) from 'S4' to 'A8' (in group 1) with bigger node, in brighter color or any visual effect that helps. Additionally, this example dims or turns down the focus of other outlier sub-networks (or group 2) with translucent effect or any equivalent visual effects that produces lower visibility.

Figure 12:
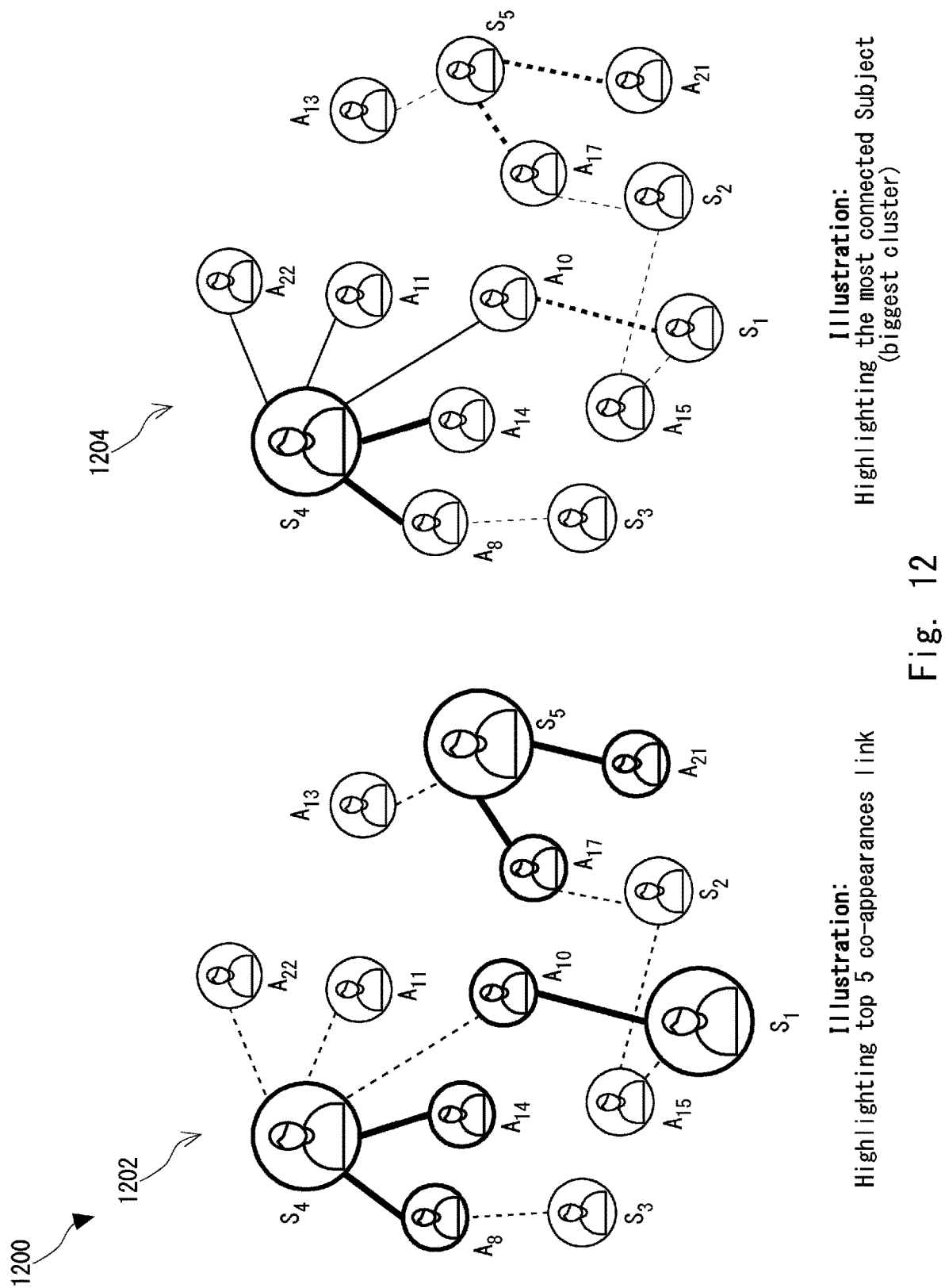
FIG. 12 shows a graphical representation of adaptively displaying at least one potential subject and a target subject according to an embodiment of the present disclosure.

FIG. 12 shows a graphical representation of adaptively displaying at least one potential subject and a target subject according to an embodiment of the present disclosure. In this example, it is possible for user to use criteria-based highlighting to set a threshold. In 1202, it shows the illustration of the target subject and top the five co-appearance links when the criteria is set to top five links. If the criteria is set to highlighting the most connected subject, S4 and the potential subjects that are linked to S4 will be highlighted as shown in 1204.

This example is designed to effectively narrow the search based on the popular criteria such as shown. These shortcuts allow user to focus on the stronger associates and most connected target subject in a single click. Sample of the criteria: Top 5, Top 10 links, and the Most Connected Person.

Figure 13:
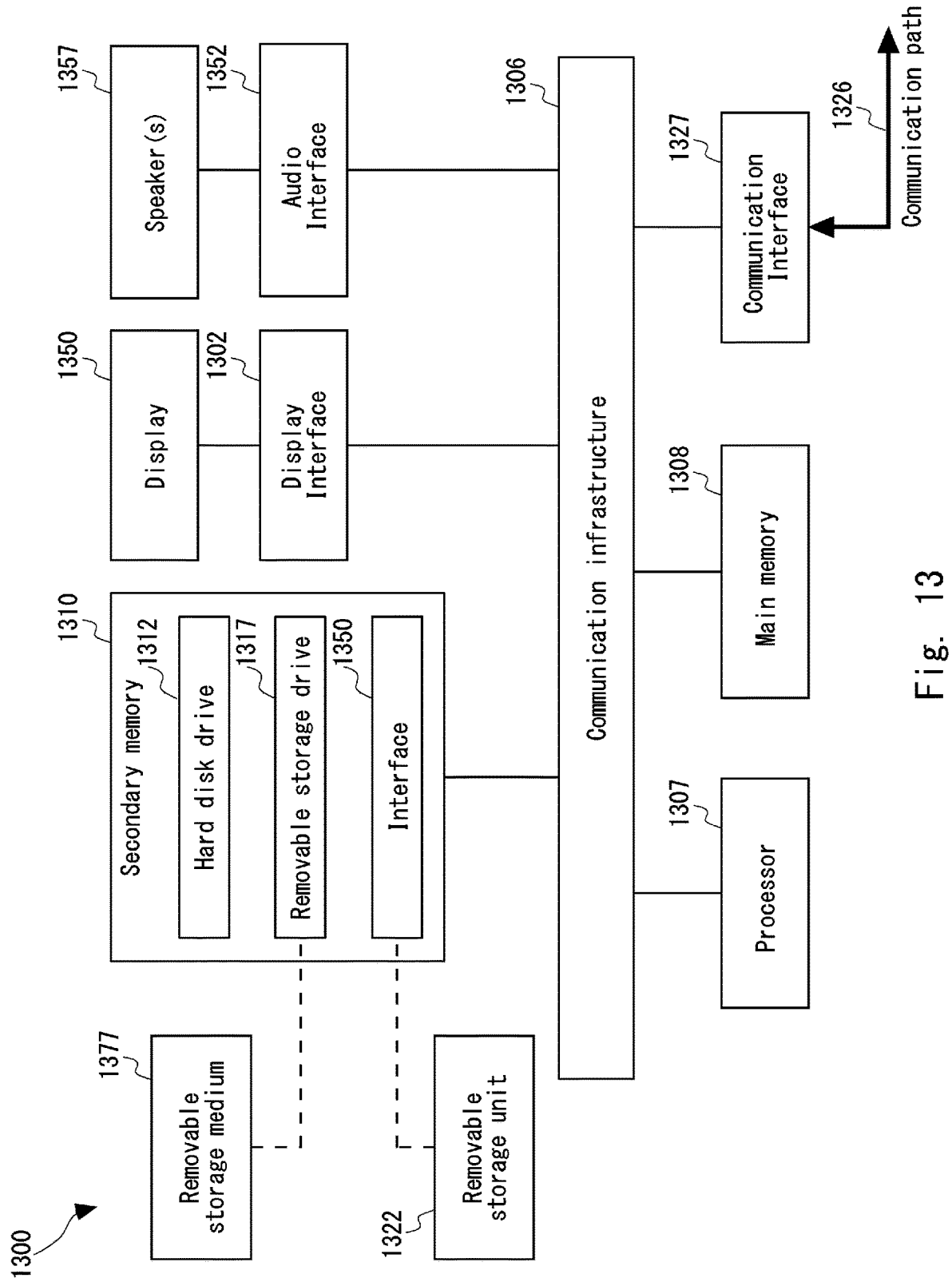
FIG. 13 shows an exemplary computing device that may be used to execute the method of the earlier figures.

FIG. 13 depicts an exemplary computing device 1300, hereinafter interchangeably referred to as a computer system 1200, where one or more such computing devices 1300 may be used to execute the methods shown above. The exemplary computing device 1300 can be used to implement the system 100 shown in FIG. 1. The following description of the computing device 1300 is provided by way of example only and is not intended to be limiting.

As shown in FIG. 13, the example computing device 1300 includes a processor 1307 for executing software routines. Although a single processor is shown for the sake of clarity, the computing device 1300 may also include a multi-processor system. The processor 1307 is connected to a communication infrastructure 1306 for communication with other components of the computing device 1300. The communication infrastructure 1306 may include, for example, a communications bus, cross-bar, or network.

The computing device 1300 further includes a main memory 1308, such as a random access memory (RAM), and a secondary memory 1310. The secondary memory 1310 may include, for example, a storage drive 1312, which may be a hard disk drive, a solid state drive or a hybrid drive and/or a removable storage drive 1317, which may include a magnetic tape drive, an optical disk drive, a solid state storage drive (such as a USB flash drive, a flash memory device, a solid state drive or a memory card), or the like. The removable storage drive 1317 reads from and/or writes to a removable storage medium 1377 in a well-known manner. The removable storage medium 1377 may include magnetic tape, optical disk, non-volatile memory storage medium, or the like, which is read by and written to by removable storage drive 1317. As will be appreciated by persons skilled in the relevant art(s), the removable storage medium 1377 includes a computer readable storage medium having stored therein computer executable program code instructions and/or data.

In an alternative implementation, the secondary memory 1310 may additionally or alternatively include other similar means for allowing computer programs or other instructions to be loaded into the computing device 1300. Such means can include, for example, a removable storage unit 1322 and an interface 1350. Examples of a removable storage unit 1322 and interface 1350 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1322 and interfaces 1350 which allow software and data to be transferred from the removable storage unit 1322 to the computer system 1300.

The computing device 1300 also includes at least one communication interface 1327. The communication interface 1327 allows software and data to be transferred between computing device 1300 and external devices via a communication path 1327. In various embodiments of the inventions, the communication interface 1327 permits data to be transferred between the computing device 1300 and a data communication network, such as a public data or private data communication network. The communication interface 1327 may be used to exchange data between different computing devices 600 which such computing devices 1300 form part an interconnected computer network. Examples of a communication interface 1327 can include a modem, a network interface (such as an Ethernet card), a communication port (such as a serial, parallel, printer, GPIB, IEEE 1394, RJ45, USB), an antenna with associated circuitry and the like. The communication interface 1327 may be wired or may be wireless. Software and data transferred via the communication interface 1327 are in the form of signals which can be electronic, electromagnetic, optical or other signals capable of being received by communication interface 1327. These signals are provided to the communication interface via the communication path 1327.

As shown in FIG. 13, the computing device 1300 further includes a display interface 1302 which performs operations for rendering images to an associated display 1350 and an audio interface 1352 for performing operations for playing audio content via associated speaker(s) 1357.

As used herein, the term "computer program product" may refer, in part, to removable storage medium 1377, removable storage unit 1322, a hard disk installed in storage drive 1312, or a carrier wave carrying software over communication path 1327 (wireless link or cable) to communication interface 1327. Computer readable storage media refers to any non-transitory, non-volatile tangible storage medium that provides recorded instructions and/or data to the computing device 1300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1300. Examples of transitory or non-tangible computer readable transmission media that may also participate in the provision of software, application programs, instructions and/or data to the computing device 1300 include radio or infra-red transmission channels as well as a network connection to another computer or networked device, and the Internet or Intranets including e-mail transmissions and information recorded on Websites and the like.

The computer programs (also called computer program code) are stored in main memory 1308 and/or secondary memory 1310. Computer programs can also be received via the communication interface 1327. Such computer programs, when executed, enable the computing device 1300 to perform one or more features of embodiments discussed herein. In various embodiments, the computer programs, when executed, enable the processor 1307 to perform features of the above-described embodiments. Accordingly, such computer programs represent controllers of the computer system 1300.

Software may be stored in a computer program product and loaded into the computing device 1300 using the removable storage drive 1317, the storage drive 1312, or the interface 1350. The computer program product may be a non-transitory computer readable medium. Alternatively, the computer program product may be downloaded to the computer system 1300 over the communications path 1327. The software, when executed by the processor 1307, causes the computing device 1300 to perform the necessary operations to execute the method as described above.

It is to be understood that the embodiment of FIG. 13 is presented merely by way of example to explain the operation and structure of the system 100. Therefore, in some embodiments one or more features of the computing device 1300 may be omitted. Also, in some embodiments, one or more features of the computing device 1300 may be combined together. Additionally, in some embodiments, one or more features of the computing device 1300 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

Further, the whole or part of the embodiments disclosed above can be described as, but not limited to, the following supplementary notes.

(Supplementary Note 1)

A method of adaptively displaying at least one potential subject and a target subject, the method comprising:

receiving an input selecting the target subject from a network graph including a plurality of subjects who appear in the proximity as the target subject;

identifying the at least one potential subject based on a threshold, the threshold indicating the minimum level of relatedness from the target subject; and displaying the at least one potential subject, the target subject and an edge between each of the at least one potential subject and the target subject, the edge indicating a level of relationship between the at least one potential subject and the target subject.

(Supplementary Note 2)

The method of supplementary note 1, wherein the step of displaying the at least one potential subject, the target subject and an edge between each of the at least one potential subject includes:

displaying the target subject in a different manner than the at least one potential subject, the different manner being at least one of a different colour, a different size and a different shape.

(Supplementary Note 3)

The method of supplementary note 1, further comprising:

determining other subjects who do not meet the threshold.

(Supplementary Note 4)

The method of supplementary note 3, further comprising:

displaying the other subjects in a reduced node size and an edge between each of the other subjects and the target subject in a manner that is dimmer than the edge between each of the at least one potential subject and the target subject.

(Supplementary Note 5)

The method of supplementary note 3, further comprising:

eliminating the other subjects from the network graph.

(Supplementary Note 6)

The method of supplementary note 1, wherein the threshold comprises a duration during which an appearance of the at least one potential subject overlaps with the target subject.

(Supplementary Note 7)

The method of supplementary note 6, wherein the threshold further comprises a level of separation between the at least one potential subject and the target subject.

(Supplementary Note 8)

The method of supplementary note 1, wherein the step of displaying the at least one potential subject, the target subject and an edge between the at least one potential subject includes:

comparing a number of the at least one potential subject to a number of potential subjects of another target subject; and highlighting the at least one potential subject and the target subject if the number of the at least one potential subject is higher than the number of potential subjects of another target subject.

(Supplementary Note 9)

The method according to supplementary note 1, further comprising receiving the threshold.

(Supplementary Note 10)

The method according to supplementary note 1, further comprising:

detecting the plurality of subjects from an input; and determining the network graph based on co-appearance relationships among the plurality of subjects.

(Supplementary Note 11)

An apparatus for adaptively displaying at least one potential subject and a target subject, the apparatus comprising:

at least one processor; and at least one memory including computer program code;

the at least one memory and the computer program code configured to, with at least one processor, cause the apparatus at least to:

receive an input selecting the target subject from a network graph including a plurality of subjects who appear in the proximity as the target subject;

identify the at least one potential subject based on a threshold, the threshold indicating the minimum level of relatedness from the target subject; and display the at least one potential subject, the target subject and an edge between each of the at least one potential subject and the target subject, the edge indicating a level of relationship between the at least one potential subject and the target subject.

(Supplementary Note 12)

The apparatus according to supplementary note 11, wherein the at least one memory and the computer program code configured to, with at least one processor, cause the apparatus at least to:

display the target subject in a different manner than the at least one potential subject, the different manner being at least one of a different colour, a different size and a different shape.

(Supplementary Note 13)

The apparatus according to supplementary note 11, wherein the at least one memory and the computer program code configured to, with at least one processor, cause the apparatus at least to:

determine other subjects who do not meet the threshold.

(Supplementary Note 14)

The apparatus according to supplementary note 13, wherein the at least one memory and the computer program code configured to, with at least one processor, cause the apparatus at least to:

display the other subjects in a reduced node size and an edge between each of the other subjects and the target subject in a manner that is dimmer than the edge between each of the at least one potential subject and the target subject.

(Supplementary Note 15)

The apparatus according to supplementary note 13, wherein the at least one memory and the computer program code configured to, with at least one processor, cause the apparatus at least to:

eliminate the other subjects from the network graph.

(Supplementary Note 16)

The apparatus according to supplementary note 11, wherein the threshold comprises a duration during which an appearance of the at least one potential subject overlaps with the target subject.

(Supplementary Note 17)

The apparatus according to supplementary note 16, wherein the threshold further comprises a level of separation between the at least one potential subject and the target subject.

(Supplementary Note 18)

The apparatus according to supplementary note 11, wherein the at least one memory and the computer program code configured to, with at least one processor, cause the apparatus at least to:

compare a number of the at least one potential subject to a number of potential subjects of another target subject; and highlight the at least one potential subject and the target subject if the number of the at least one potential subject is higher than the number of potential subjects of another target subject.

(Supplementary Note 19)

The apparatus according to supplementary note 11, wherein the at least one memory and the computer program code configured to, with at least one processor, cause the apparatus at least to:

receive the threshold.

(Supplementary Note 20)

The apparatus according to supplementary note 11, wherein the at least one memory and the computer program code configured to, with at least one processor, cause the apparatus at least to:

detect the plurality of subjects from an input; and determine the network graph based on co-appearance relationships among the plurality of subjects.

This application is based upon and claims the benefit of priority from Singapore Patent Application NO. 10202005811P, filed on 18 Jun. 2020, the disclosure of which is incorporated herein in its entirety by reference.

REFERENCE SIGNS LIST

100 system
102 requestor device
108 contact tracing server
116 connection
120 connection
121 connection
122A to 122N connection
140 remote assistance server
142A to 142N sensor
144A to 144N connection
146A to 146N connection
150A to 150N remote assistance host

The invention claimed is:

1. A method of adaptively displaying at least one potential subject and a target subject, the method comprising:

receiving an input selecting the target subject from a network graph including a plurality of subjects who appear in the proximity as the target subject;

detecting the plurality of subjects from an input;

determining the network graph based on co-appearance relationships among the plurality of subjects;

identifying the at least one potential subject based on a threshold, the threshold indicating the minimum level of relatedness from the target subject, and including a distance between the plurality of subjects, the distance being determined based on a sum of inverse values of co-appearance strengths between the plurality of subjects;

including, in the at least one potential subject, a subject for which the distance is equal to or less than the threshold;

displaying the at least one potential subject, the target subject and an edge between each of the at least one potential subject and the target subject, the edge indicating a level of relationship between the at least one potential subject and the target subject;

determining other subjects who do not meet the threshold;

displaying the other subjects in a reduced node size and an edge between each of the other subjects and the target subject in a manner that is dimmer than the edge between each of the at least one potential subject and the target subject;

identifying groups based on the distance; and determining the display manner of edges for each group, wherein displaying the at least one potential subject, the target subject and an edge between each of the at least one potential subject includes:

displaying the target subject in a different manner than the at least one potential subject, the different manner being at least one of a different color, a different size and a different shape.

2. The method of claim 1, further comprising:

eliminating the other subjects from the network graph.

3. The method of claim 1, wherein the threshold further comprises a duration during which an appearance of the at least one potential subject overlaps with the target subject.

4. The method of claim 3, wherein the threshold further comprises a level of separation between the at least one potential subject and the target subject.

5. The method of claim 1, wherein the step of displaying the at least one potential subject, the target subject and an edge between the at least one potential subject includes:

comparing a number of the at least one potential subject to a number of potential subjects of another target subject; and highlighting the at least one potential subject and the target subject if the number of the at least one potential subject is higher than the number of potential subjects of another target subject.

6. The method according to claim 1, further comprising receiving the threshold.

7. An apparatus for adaptively displaying at least one potential subject and a target subject, the apparatus comprising:

at least one processor; and at least one memory including computer program code wherein the at least one memory and the computer program code are configured to, with at least one processor, cause the apparatus at least to perform processing comprising:

receiving an input selecting the target subject from a network graph including a plurality of subjects who appear in the proximity as the target subject;

detecting the plurality of subjects from an input;

determining the network graph based on co-appearance relationships among the plurality of subjects;

identifying the at least one potential subject based on a threshold, the threshold indicating the minimum level of relatedness from the target subject, and including a distance between the plurality of subjects, the distance being determined based on a sum of inverse values of co-appearance strengths between the plurality of subjects;

including, in the at least one potential subject, a subject for which the distance is equal to or less than the threshold;

displaying the at least one potential subject, the target subject and an edge between each of the at least one potential subject and the target subject, the edge indicating a level of relationship between the at least one potential subject and the target subject;

determining other subjects who do not meet the threshold;

displaying the other subjects in a reduced node size and an edge between each of the other subjects and the target subject in a manner that is dimmer than the edge between each of the at least one potential subject and the target subject;

identifying groups based on the distance; and determining the display manner of edges for each group, wherein displaying the at least one potential subject, the target subject and an edge between each of the at least one potential subject includes:

displaying the target subject in a different manner than the at least one potential subject, the different manner being at least one of a different color, a different size and a different shape.

8. The apparatus according to claim 7, wherein the at least one memory and the computer program code are configured to, with at least one processor, cause the apparatus at least to:

eliminate the other subjects from the network graph.

9. The apparatus according to claim 7, wherein the threshold further comprises a duration during which an appearance of the at least one potential subject overlaps with the target subject.

10. The apparatus according to claim 9, wherein the threshold further comprises a level of separation between the at least one potential subject and the target subject.

11. The apparatus according to claim 7, wherein the at least one memory and the computer program code are configured to, with at least one processor, cause the apparatus at least to:

compare a number of the at least one potential subject to a number of potential subjects of another target subject; and highlight the at least one potential subject and the target subject if the number of the at least one potential subject is higher than the number of potential subjects of another target subject.

12. The apparatus according to claim 7, wherein the at least one memory and the computer program code are configured to, with at least one processor, cause the apparatus at least to:

receive the threshold.

\* \* \* \* \*